(12) United States Patent
Parent et al.

(10) Patent No.: US 12,111,461 B2
(45) Date of Patent: Oct. 8, 2024

(54) WIDE-ANGLE LENS WITH FREEFORM SURFACE

(71) Applicant: ImmerVision, Inc., Montreal (CA)

(72) Inventors: Jocelyn Parent, Montreal (CA); Simon Thibault, Quebec (CA); Zhenfeng Zhuang, Montreal (CA); Patrice Roulet, Montreal (CA); Xavier Dallaire, Verdun (CA); Xiaojun Du, Montreal (CA); Pierre Konen, Saint-Bruno (CA)

(73) Assignee: IMMERVISION, INC., Montreal (CA)

( * ) Notice: Subject to any disclaimer, the term of this patent is extended or adjusted under 35 U.S.C. 154(b) by 371 days.

(21) Appl. No.: 17/360,411

(22) Filed: Jun. 28, 2021

(65) Prior Publication Data
US 2021/0405355 A1    Dec. 30, 2021

Related U.S. Application Data

(60) Provisional application No. 63/044,607, filed on Jun. 26, 2020.

(51) Int. Cl.
| G02B 27/00 | (2006.01) |
| G02B 3/00 | (2006.01) |
| G02B 3/04 | (2006.01) |
| G02B 13/18 | (2006.01) |

(52) U.S. Cl.
CPC ........... *G02B 27/0012* (2013.01); *G02B 3/04* (2013.01); *G02B 13/18* (2013.01); *G02B 2003/0093* (2013.01)

(58) Field of Classification Search
CPC ............ G02B 27/0025; G02B 27/0012; G02B 27/0927; G02B 3/04; G02B 13/18; G02B 13/06; G02B 2003/0093

USPC ................. 359/720, 725, 207.5; 351/159.71, 351/159.73, 178
See application file for complete search history.

(56) References Cited

U.S. PATENT DOCUMENTS

| 1,664,093 A * | 3/1928 | Stevens .................... G02C 5/00 351/159.73 |
| 6,865,028 B2 | 3/2005 | Moustier et al. |
| (Continued) |

FOREIGN PATENT DOCUMENTS

| WO | 2019129872 A1 | 7/2019 |
| WO | 2020086603 A1 | 4/2020 |

OTHER PUBLICATIONS

Int'l Preliminary Report on Patentability mailed Jan. 5, 2023 in Int'l Application No. PCT/IB2021/055725.
(Continued)

*Primary Examiner* — Travis S Fissel
(74) *Attorney, Agent, or Firm* — Panitch Schwarze Belisario & Nadel LLP

(57) ABSTRACT

A method for designing a wide-angle optical system having at least one freeform optical surface without rotational symmetry to create a custom 2D object-image mapping. The method is based on iteratively adjusting the at least one freeform optical 2D surface shape to have the exact 2D object-image mapping required and then adjusting the optical element surfaces to meet the other required optical specifications. The iterative method is applied until both the desired 2D object-image mapping and the other required optical specifications are reached.

10 Claims, 7 Drawing Sheets

(56) References Cited

U.S. PATENT DOCUMENTS

| | | | | |
|---|---|---|---|---|
| 2004/0099972 A1* | 5/2004 | Morris | ............ | B29D 11/00009 |
| | | | | 264/1.32 |
| 2015/0338680 A1* | 11/2015 | Spratt | .................... | G02C 7/024 |
| | | | | 351/159.76 |
| 2020/0355912 A1* | 11/2020 | Durr | .................. | G02B 27/0012 |

OTHER PUBLICATIONS

Int'l Search Report issued Sep. 24, 2021 in Int'l Application No. PCT/IB2021/055725.

\* cited by examiner

WIDE-ANGLE LENS WITH FREEFORM SURFACE

CROSS-REFERENCE TO RELATED APPLICATIONS

The present application claims the benefit of U.S. Provisional Patent Application No. 63/044,607, filed on Jun. 26, 2020, entitled "Wide-angle lens with freeform surface," currently pending, the entire contents of which are incorporated by reference herein.

BACKGROUND OF THE INVENTION

Embodiments of the present invention relate to the field of optical lenses and their design and more particularly of an optical construction of a wide-angle lens having at least one freeform surface to better control the distortion profile.

The optical design of a wide-angle lens, especially for consumer applications like in modern smartphones, requires the use of multiple aspherical surfaces on optical elements in order to balance the optical aberrations as much as possible and deliver the ever-increasing required performance. When the required mapping function between the object scene and the image plane is symmetrical around the optical axis of the wide-angle lens, rotationally symmetrical aspherical surfaces are generally enough, and the use of an asymmetrical freeform surface is not required.

However, when an application requires an asymmetrical distribution of the mapping between the object scene and the image plane, the use of optical surfaces breaking with the rotational symmetry around the optical surface, generally known as freeform surfaces, is required. While the use of asymmetrical freeform surfaces to create asymmetrical distortion profiles has been presented in the past as in U.S. Pat. No. 6,865,028, there has never been a method to create the desired distortion profile with the optimal surface shape. Finding a shape for one or multiple freeform surfaces to get the required object-image mapping for the particular application is computationally demanding and the possibility of finding the optimal freeform surface shape during an optical optimization process generally depends on starting from a surface close enough to the optimal shape, which is increasingly complex with wide-angle lenses because of their naturally occurring optical distortion in the object-image mapping.

Hence, a new method to design wide-angle optical systems with at least one freeform surface is required in order to have a required custom 2D object-image mapping function and meet all the other required optical specifications.

BRIEF SUMMARY OF THE INVENTION

To overcome all the previously mentioned challenges of optimizing 2D freeform surfaces, embodiments of the present invention present a method to create an optical system having at least one freeform surface in order to adjust precisely a 2D object-image mapping function. The method includes iterative steps, starting with an original optical design having performances close to the desired final performances. Then, the method shows how to calculate the shape of the freeform surface to get the exact desired 2D object-image mapping function by adjusting either the sag, the curvature, or the slope of the freeform surface in a predefined sampling grid and interpolating or fitting the total surface. Then, other optical surfaces of the optical system are adjusted to meet the other optical requirements of the system, including the image quality or the like. Depending on if all the requirements are met or not, the iterative method then goes back to the step of calculating a new shape for the freeform surface or ends with a final optical design.

For a given target 2D object-image mapping function, the method of the present invention is then used to optimize an example optical imaging wide-angle lens system having as an example a total field of view of 120° in both Y and X directions. The resulting optical system has a freeform surface on the object side of the first optical element to reach the desired 2D object-image mapping function.

In some embodiments of the present invention, there is a link between the sag of the freeform surface and the resolution curve defined as the mathematical derivative of the object-image mapping function along a chosen direction. This is especially visible when the resolution curve has at least one local minimum or maximum, the number and the location of the at least one local minimum or maximum being close to each other within a given margin.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
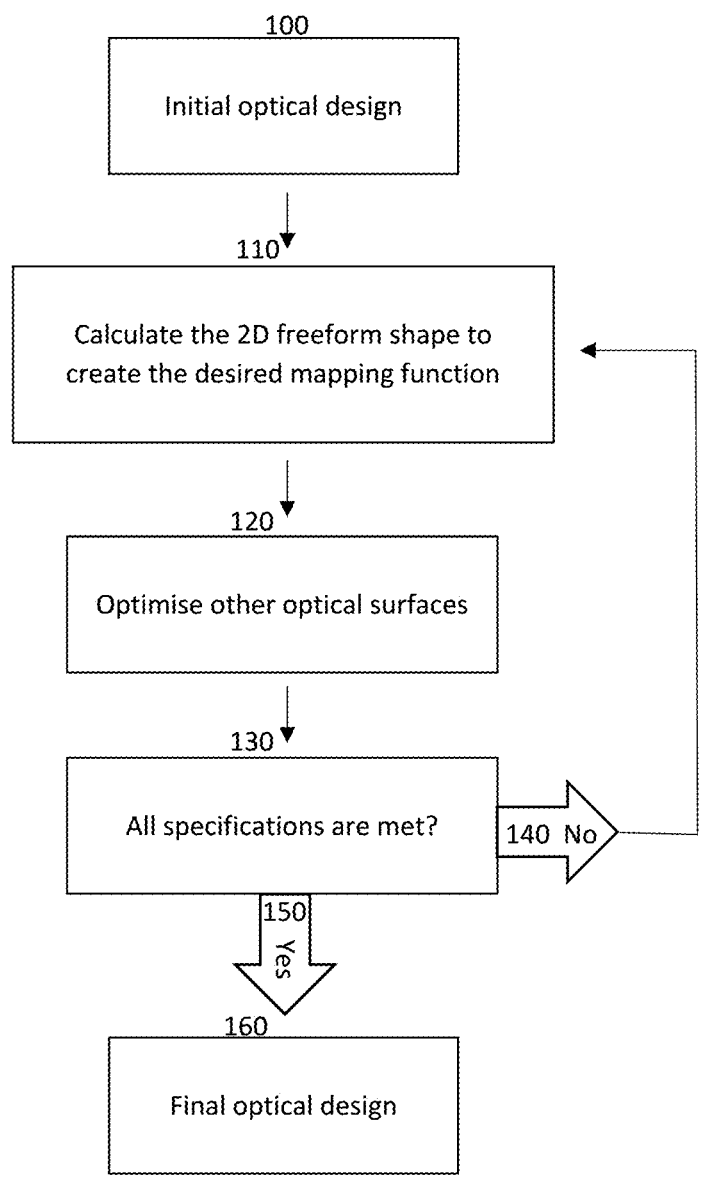
FIG. 1 shows an example embodiment of the method to adjust a freeform surface shape to get an optical system with the desired 2D object-image mapping function.

FIG. 1 shows a method for creating an optical system with a target 2D object-image mapping derivative function by adjusting at least one freeform surface shape and at least one other optical surface. Most optical systems are built with a rotational symmetry around their central axis, often called the optical axis. The rotationally symmetric imaging optical systems, including any combinations of reflecting mirrors, refractions lenses, Fresnel or discontinuous elements, diffracting optical elements, meta-surfaces or the like, are used to create an image of an object scene in an image plane in which a film or an image sensor is generally located. The relation between the coordinate of a given object point in object space and the coordinate of the corresponding image point on the image surface is called the object-image mapping function. For rotationally symmetrical systems, this object-image mapping function is in one dimension and can be expressed in various ways and with different units. A common way to define this object-image function, in no way limiting the possible definitions of this mapping function according to the present invention, is to link the object angle in degrees to the image height in mm. When the optical system breaks the rotational symmetries using asymmetrical optical elements, often known as freeform optical elements, the object-image mapping is now a 2D function relating angles in the object space and heights in the image plane. For this invention, a freeform lens is understood to be an optical element having at least one freeform surface and a freeform surface is understood to be an optical surface that is on-purpose non-rotationally symmetrical around a central axis. A lens element intended and designed to be perfectly rotationally symmetrical but that is just slightly asymmetrical due to small fabrication errors is not considered a freeform lens according to this invention. Designing an optical system having a desired 2D object-image mapping function is exponentially more challenging than a system with rotational symmetry having a 1D object-image mapping function because the full 2D space must be considered instead of a single 1D line. Existing optical design optimization software is not well suited for this and the resulting 2D object-image mapping function of a system is often far from the originally desired function. The optimization method according to the present invention starts by using an initial optical design prescription 100. The prescription of an optical design is a list of all the variables needed to manufacture an optical design, including the radius of curvature, thickness, material, conic constant, and other extra parameters of each surface. These prescriptions are generally adjusted inside optical design software, such as Zemax, CodeV, Oslo or the like. This optical design software can be executed on any kind of device able to execute software, such as a desktop personal computer, a laptop computer, or the like. The initial optical design 100 is generally chosen to have optical performance as close as possible to the desired final performance in order to minimize the optimization complexity required, but the initial optical design 100 could also have significantly different performance when such a close initial optical design is not available. This initial optical design 100 that serves as a starting point for the method often comes from a large bank of optical design starting points. The next step is to alternate, until a final design prescription is obtained, the steps of calculating at least one of a sag, a slope or a curvature of the at least one freeform surface to get an optical design prescription with the target 2D object-image mapping derivative function and optimizing at least one other optical surface. The first part 110 of this iterative step is to calculate the exact shape of a 2D freeform surface that would give exactly the required 2D mapping function. In a preferred embodiment of the present innovation, this is done by scanning the freeform surface in the X and Y directions with a predefined sampling and adjusting the local surface sag, the local surface curvature or the local surface slope in order to change the directions of the chief-rays hitting the freeform surface at the sampled locations. This calculation can be done either using algorithms in a mathematical calculation software like Matlab, using algorithms written in custom programming language like C++ or Python, or inside an optical design software by freezing all other variables of the system. All of these algorithms to calculate the exact shape of the freeform surface are executed on a device able to execute software algorithms, like a desktop personal computer, a laptop computer, or the like. From the sampled sag, curvature or slopes, a full surface freeform surface can then be interpolated or fitted to replace the previous surface in the optical design. In a preferred embodiment of the present innovation, the freeform surface used to adjust the 2D object-image mapping function is a first optical surface of the optical system, meaning the first optical surface (excluding protection domes or protection windows) to receive rays of light from the object scene in order to create an image in the image plane of the optical system, but this freeform surface could be any other surface according to the present invention. Doing this step 110 fixes exactly the 2D object-image mapping function, at the potential expense of breaking other specifications like image quality or the like. In a preferred embodiment, the sag of the at least one freeform surface of the built optical system has at least one local minimum or local maximum across its surface and the 2D object-image mapping derivative function has at least one local minimum or local maximum. The next part 120 of the iterative step is to optimize the at least one other optical surface in the optical system while keeping the calculated freeform surface from step 110 constant in order to satisfy the other required optical specifications. This at least one other surface can be of any shape, including of plano, spherical, aspherical or freeform shape. In some embodiments according to the present invention, an optimization on a second freeform surface other than the first freeform surface used to control the distortion, the second freeform surface having an identical number of local minimums or local maximums than the first freeform surface in at least one corresponding coordinate system, is done to improve the image quality. This step 120 can break slightly the object-image mapping set at step 110 and hence the next step 130 is a check on whether the object-image mapping is within the accepted range and all other optical specifications are also met. If no, the iterative method goes in the direction 140 back to the step 110 to recalculate a new freeform surface matching the desired object-image mapping function with the updated shape of the other optical surfaces. If yes, the iterative method goes in the direction 150 to an end and we reach the final optical design at step 160 at which point the method ends by building the optical system according to the final design prescription obtained.

Figure 2A:
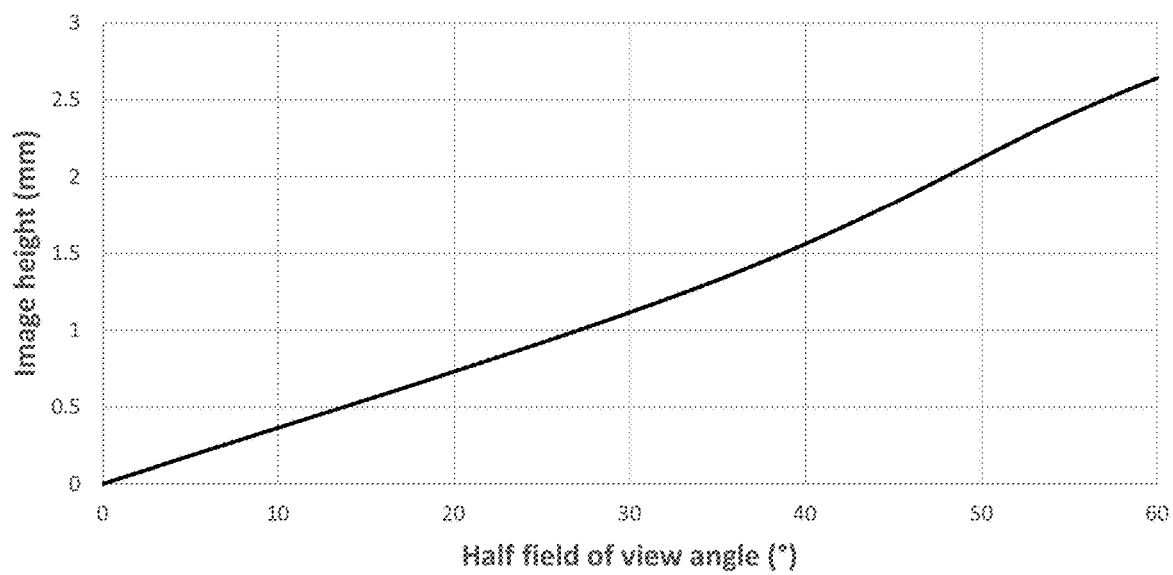
FIGS. 2A-2B show an example target object-image mapping function in the Y direction and in the X direction, respectively.
Figure 2B:
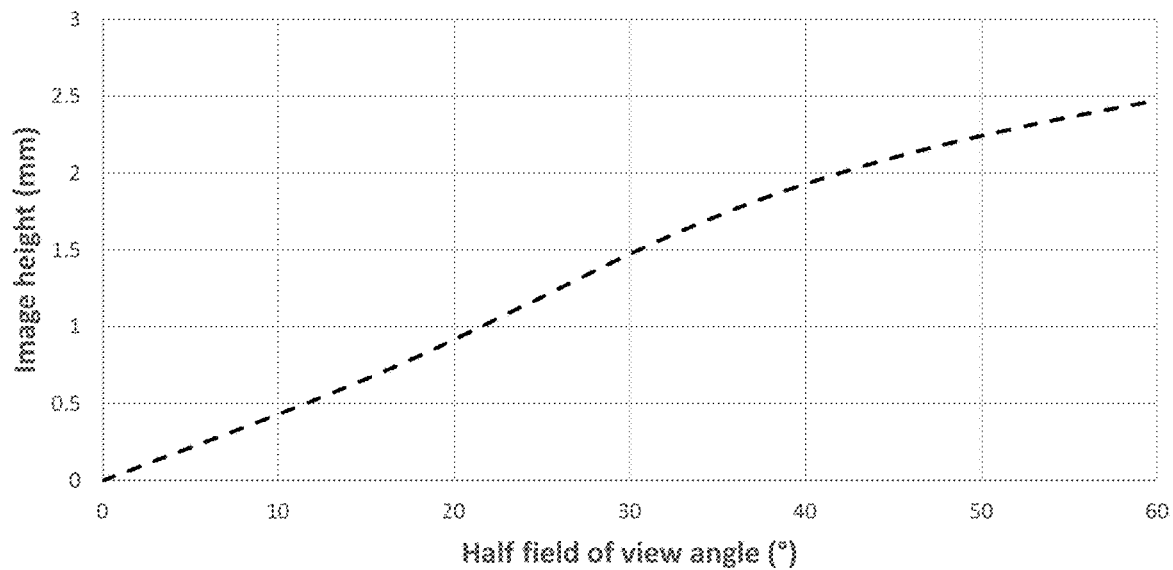

FIGS. 2A-2B show an example of asymmetrical target 2D object-image mapping function. For easier representation, only the curve in the positive Y direction 200 and the curve in the positive X direction 250 are shown, but it is to be understood that the 2D object-image mapping function is a full continuous 2D function between two object coordinates and two image coordinates. The 2D object-image mapping function is not rotationally symmetrical with respect to an optical axis, but it could be symmetrical or not with respect to any other axis or plane. For the object space, the coordinates used are the half field of view angle in the Y direction and the half field of view angle in the X direction, here shown in degrees. For the image space, the coordinates used are the image height in the Y direction and the image height in the X direction, here shown in millimeters. These used coordinates are selected for easier understanding of the example of FIGS. 2A-2B, but other coordinates could be used for the 2D object-image mapping function, including cartesian, polar, cylindrical, spherical or any other 2D or 3D coordinate system. In some other cases, instead of using an angular coordinate for the object, the mapping function could be between an object height in mm and an image height also in mm or any other combination between an object coordinate and an image coordinate. The asymmetry between the mapping function in the Y direction 200 and the mapping function in the X direction 250 is visible by the different slopes of the function, but it will be even more clear in the representation of FIGS. 3A-3B showing the resolution curves which are the mathematical derivatives of the mapping function in the Y and X directions.

Figures 3A, 3B:
FIGS. 3A-3B show the mathematical derivative of the target object-image mapping function in the Y direction and in the X direction, respectively.

FIGS. 3A-3B show the mathematical derivatives of the target 2D object-image mapping function in the Y direction and in the X direction from FIGS. 2A-2B, also known as the resolution curves. Again, for easier representation, only the derivative curve in the positive Y direction 300 and the derivative curve in the positive X direction 350 are shown, but it is to be understood that the derivative of the 2D object-image mapping function is a full continuous 2D function. Here, the resolution is shown in μm of image height per degree of the field of view, but other units could be used, including pixels per degree when an image sensor of known pixel size is used with the system. The difference between the resolution curve in the Y direction and the resolution curve in the X direction is easier to see compared to the mapping function of FIGS. 2A-2B, but both figures are representations of the same mapping between the object and the image space. In this example, in no way limiting the scope of the present invention, the derivative curve in the positive Y direction 300 has a maximum 310 at a half field of view angle of ≈48°, representing a desired zone of interest in the mapping function. In the other direction, the derivative curve in the positive X direction 350 has a maximum 360 at a half field of view angle of ≈25°, representing a desired different zone of interest in the mapping function. The mapping function of FIGS. 2A-2B and its derivatives of FIG. 3A-3B are the target from step 120 of the method according to the present invention as will be clear with the embodiment of FIGS. 4A-4B.

Figure 4A:
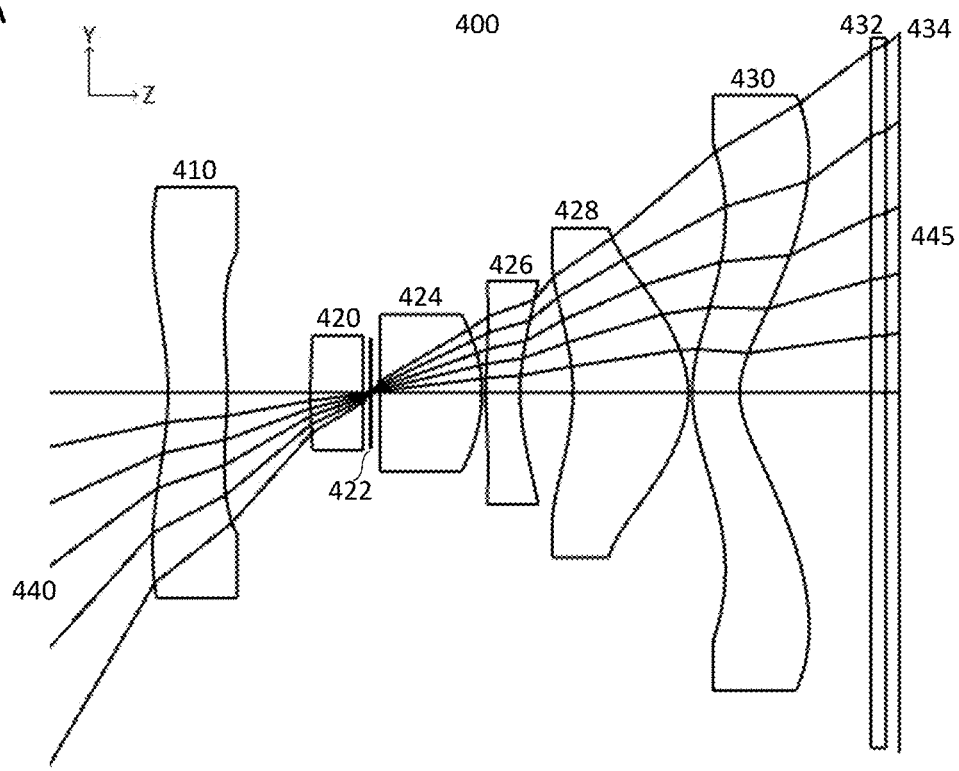
FIGS. 4A-4B show an example layout in the Y-Z and X-Z planes, respectively, of an optical system optimized with the method to adjust a freeform surface shape to get the desired 2D object-image mapping function.
Figure 4B:
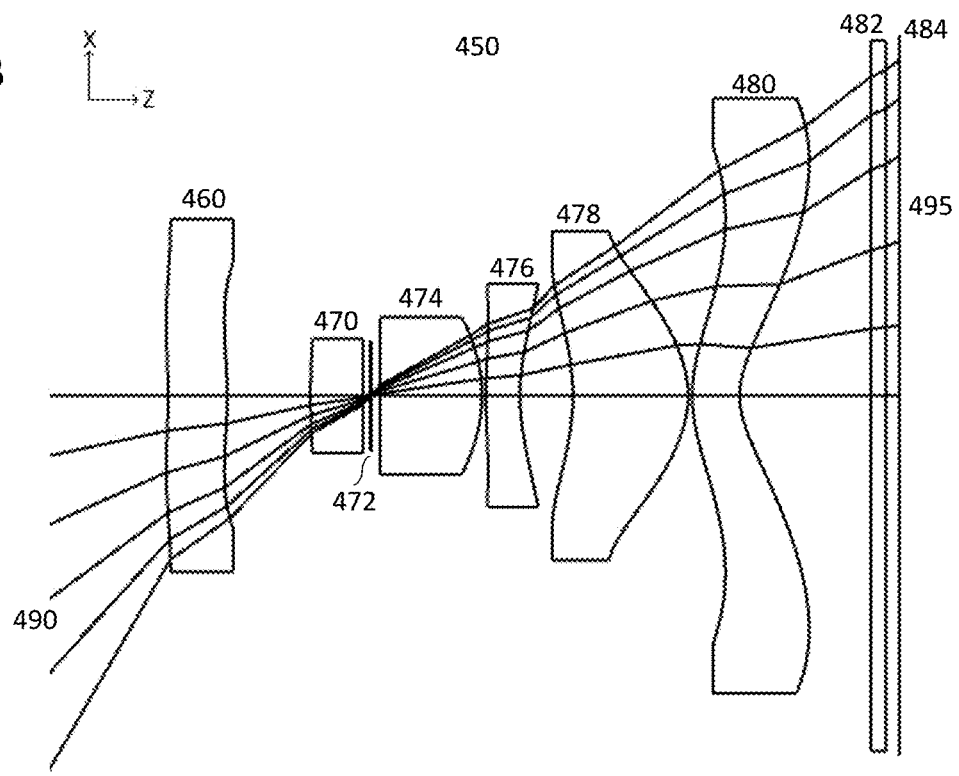

FIGS. 4A-4B show an example layout of an optical system optimized with the method to adjust a freeform surface shape to get the desired 2D object-image mapping function. The optical system includes a plurality of optical elements forming an image of the scene in an image plane. The top layout 400 in FIG. 4A shows a cut of the lens in the Y-Z plane while the bottom layout 450 in FIG. 4B shows a cut of the lens in the X-Z plane. Both layouts have an object side on the left and an image side on the right. The method of FIG. 1 has been applied on the example optical system of FIGS. 4A-4B, but this embodiment is just an example and the method according to the present invention can be applied on any optical system. In this example, the freeform surface adjusted to get the desired 2D object-image mapping function is on the object side of the first element, as seen by the different shape of the element L1 410 in the Y-Z direction and element L1 460 in the X-Z direction. This location for the freeform surface is just an example, and the freeform surface used could be at any location in the optical system, but it is generally as far from the aperture stop in the region where the rays are well separated from each other so that we can adjust the mapping function locally by adjusting the freeform surface shape. The freeform surface could be of any type of surface without rotational symmetry according to the present invention, including surfaces defined by polynomial series in X and in Y or in other similar coordinate systems, cylindrical elements having different curvatures in two axes, toroidal elements, surfaces defined point by point with their sag, slope or curvature by a grid or a table, 2D spline or NURBS surfaces, surfaces defined by Zernike or Chebyshev polynomials, pedal surfaces or any other custom mathematical surface that can be used to describe a freeform surface. In this example, the optical system also includes multiple symmetrical elements represented by their identical shapes in the layout 400 and the layout 450, including a lens L2 (420, 470), an aperture stop (422,472), a lens L3 (424,474), a lens L4 (426,476), a lens L5 (428,478), a lens L6 (430,480), a sensor cover glass and filter (432, 482) and an image plane (434,484), position at which an image sensor is generally located. In other embodiments according to the present invention, both surfaces of L1 could be of freeform shape to better control the mapping function instead of just the surface on the object side. In other embodiments according to the present invention, there can be an unlimited number of freeform surfaces or elements without rotational symmetry to either control the mapping function or to balance the other aberrations. In the example of FIGS. 4A-4B, all optical elements are made of plastic materials, but any material could be used according to the present invention, including plastics, glass, crystals or any other optical material. In the example of FIGS. 4A-4B, all optical elements are refractive, but any other way of changing the direction of optical rays could be used for any of the freeform surfaces or the rotationally symmetric elements, including reflective elements, Fresnel or discontinuous elements, diffractive elements or meta-surface elements. In both the layouts 400 and 450, six chief-rays, the ray of light passing by the center of the aperture stop, are shown at 440 and 490, representing fields of view of 0°, 12°, 24°, 36°, 48° and 60°. These equally spaced rays in the object space hit the image surface at different heights shown at 445 and 495 as explained with respect to FIGS. 2A-2B and FIGS. 3A-3B. In this example, the total field of view of the optical system is 120° and is identical in both directions, but this is just an example. In some embodiments, the field of view of the built optical system is identical in all directions. With the method according to the present invention, the total field of view could be asymmetrical and different in various directions around an optical axis, a chosen plane or any other axis in the system. For example, using the freeform surface to adjust the total field of view, the total field of view could be a first value in a first direction, a second value in a second direction not necessarily perpendicular to the first direction and could be a third different value in a third direction and the like. Also, the half field of view in a positive direction of an axis could be different than the half field of view in the negative direction of the same axis using a non-symmetrical freeform surface. Also, the method according to the present invention is for wide-angle optical systems generally having a total field of view over 60° because these systems are the ones in which a custom mapping function is generally required, but the method could be applied to optical systems of any field of view. In a preferred embodiment, the field of view of the built optical system is greater than 60° in at least one direction. In other embodiments according to the present invention, the field of view is larger than 100° in a least one direction. In other embodiments according to the present invention, the field of view is larger than 120° in a least one direction. In other embodiments according to the present invention, the field of view is larger than 150° in a least one direction. In some embodiments according to the present invention, when the freeform surface used to adjust the 2D object-image mapping function is on the first optical element of the system, the method to optimize the freeform surface shape can be done by inverting the optical system, tracing rays from the image to the object and adjusting the freeform surface shape in order to get the desired angles in the object space for a predetermined sampling in the image space and then re-inverting the optical system in its original direction from object to image.

Figure 5A:
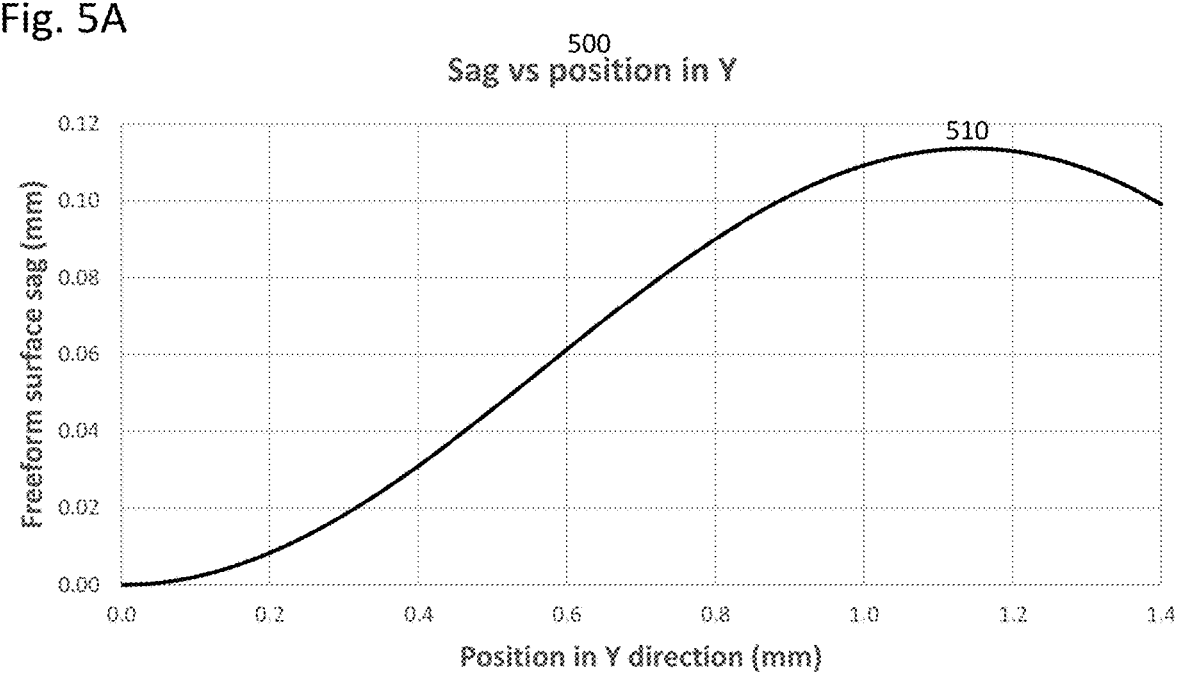
FIGS. 5A-5B show the resulting sag of the freeform surface in the Y and in the X direction, respectively, vs the position on the surface.
Figure 5B:
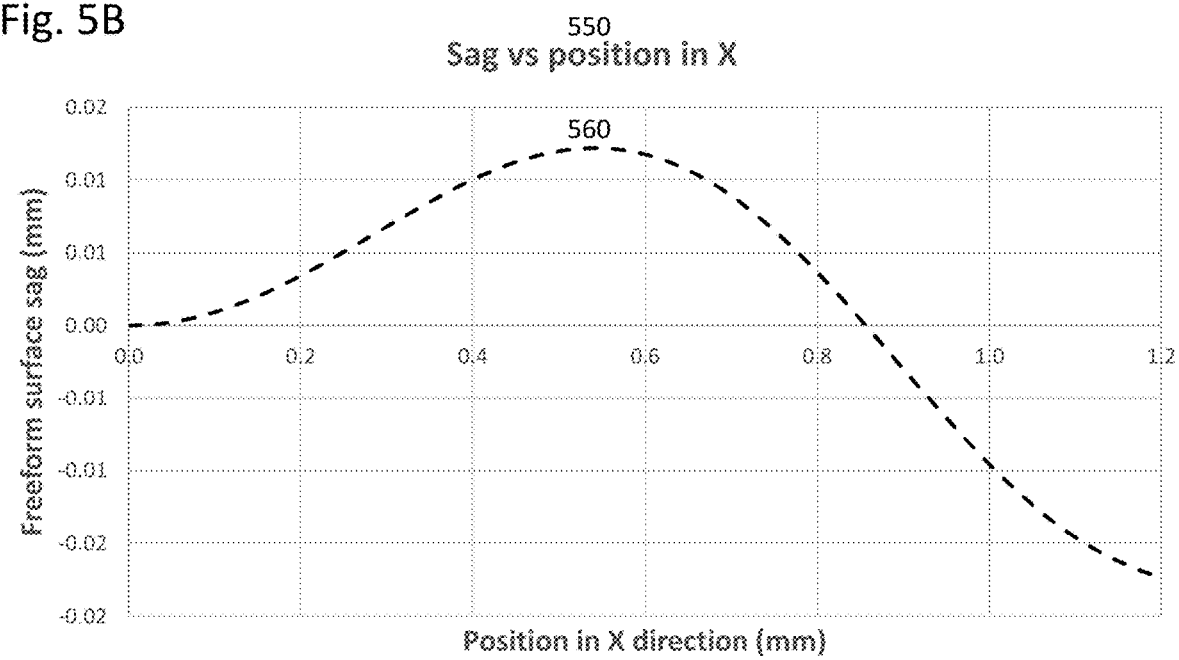

FIGS. 5A-5B shows the resulting sag of the freeform surface on the object side of L1 from the layout of FIGS. 4A-4B. The sag of the freeform surface in the Y direction is visible at the graph 500 in FIG. 5A and the sag of the freeform surface the X direction is visible at the graph 550 in FIG. 5B, both graphs shown as a function of the position on the surface from the optical axis. Because this freeform surface is the one mainly defining the 2D object-image mapping function of the system, the sag of the surface is highly related to the original target resolution graph of FIGS. 3A-3B. The graph of the freeform surface sag in the Y direction 500 has a maximum 510 at ≈1.15 mm and the graph of the freeform surface sag in the X direction 550 has a maximum 560 at ≈0.55 mm. The relation between these maximums and the resolution graph of FIGS. 3A-3B will be clearer when the sag is traced as a function of the incidence angle in the object space at FIGS. 6A-6B instead of the position from the optical axis. The maximum position of the maximum is 1.4 mm in the Y direction and 1.2 mm in the X direction, both defined by the position of the chief-ray on the surface at the maximal field of view angle.

Figure 6A:
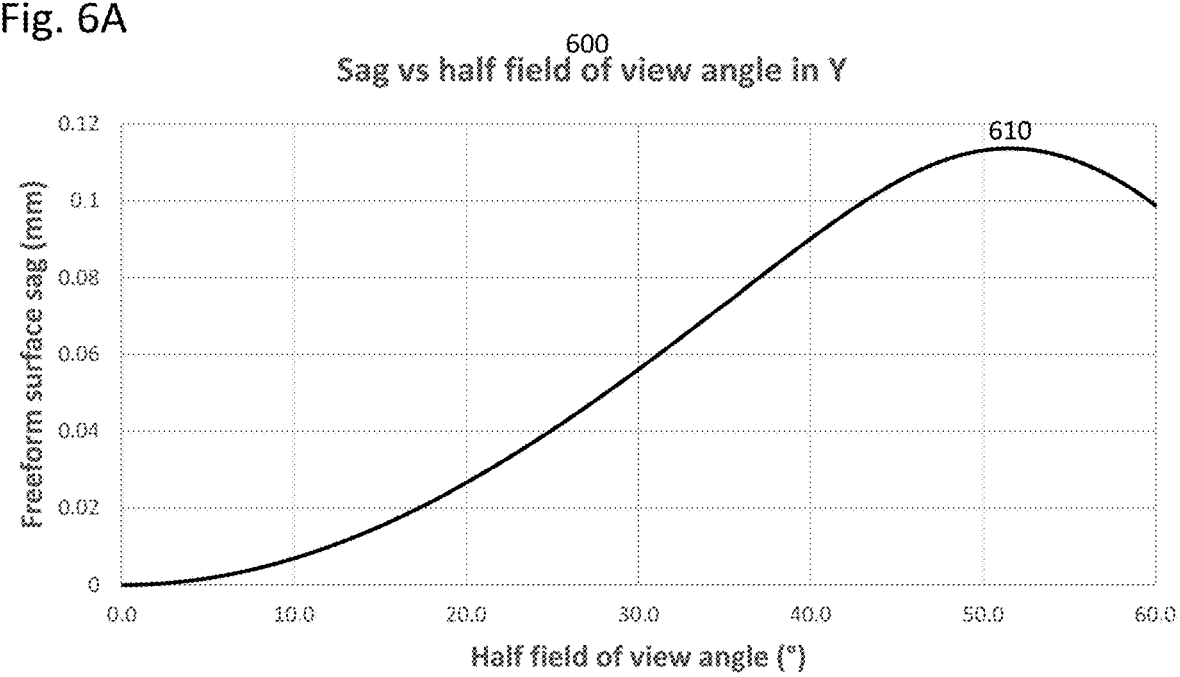
FIGS. 6A-6B show the resulting sag of the freeform surface in the Y and in the X direction, respectively, vs the half field of view angle for the chief-rays.
Figure 6B:
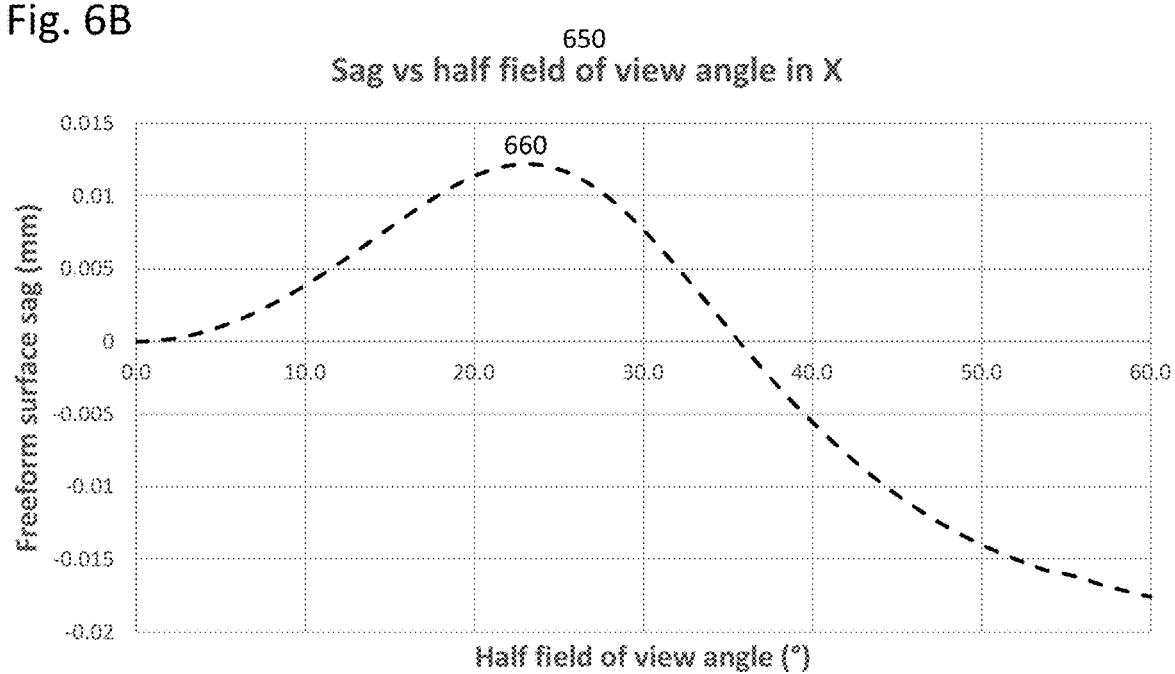

FIGS. 6A-6B show the resulting sag of the freeform surface in the Y and in the X direction vs the half field of view angle for the chief-rays hitting the freeform surfaces. The sag of the freeform surface in the Y direction is visible at the graph 600 in FIG. 6A and the sag of the freeform surface the X direction is visible at the graph 650 in FIG. 6B, both graphs shown as a function of the object field angle. Because this freeform surface is the one mainly defining the 2D object-image mapping function of the system, the sag of the surface is highly related to the original target resolution graph of FIGS. 3A-3B. The graph of the freeform surface sag in the Y direction 600 has a maximum 610 at a field angle of ≈51° and the graph of the freeform surface sag in the X direction 650 has a maximum 660 at a field angle of ≈23°. Compared to the graphs of resolution from FIGS. 3A-3B that had their maximum at a field angle of ≈48° in the Y direction and at a field angle of ≈23°, it is clear that the freeform surface on surface 1, the only surface that is different between the Y and the X direction, is the surface that contributes mainly to adjust the 2D object-image mapping function.

Figure 7:
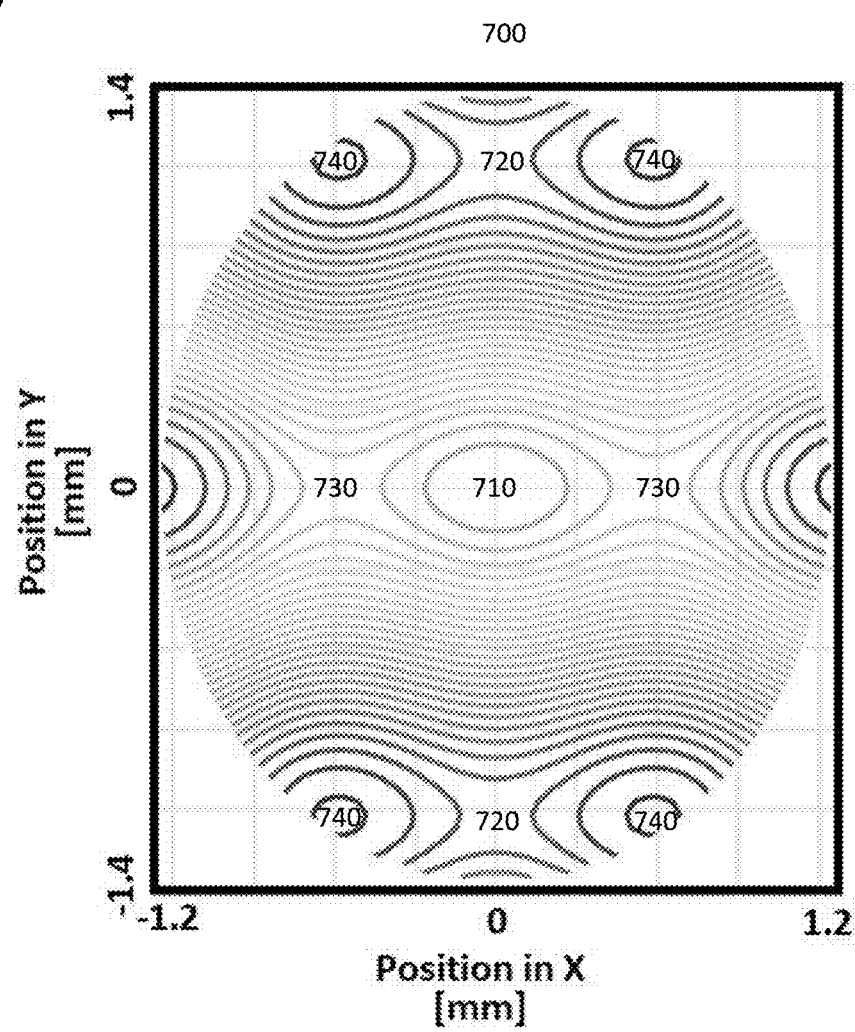
FIG. 7 shows a 2D contour of the resulting sag of the freeform surface vs the position on the surface.

FIG. 7 shows a 2D contour of the resulting sag of the freeform surface vs the position on the surface. In this 2D graph, the position 710 represent the center of the freeform surface. The surface sag has local maximums 720 on the Y axis, corresponding to the maximum 510 in the cross section along the Y direction from FIG. 5A. The surface sag also has local maximums 730 on the X axis, corresponding to the maximum 560 in the cross section along the X direction from FIG. 5B. All of the criteria between the surface sag and the resolution curve presented in this detailed description are explained with respect to the X or Y axis by simplicity, but the scanning for a minimum or a maximum can be done in any two perpendicular directions on the full 2D surface according to the present invention, as in the local maximums 740. In some embodiments according to the present invention, at least one local minimum or local maximum of the surface is not on an axis intersecting the optical axis of the optical system. When the derivative of the position 2D position curve is used to calculate the 2D resolution curve, the derivative is done with any set of orthogonal 2D coordinates, not necessarily on an axis intersecting the optical axis of the optical system like the X or Y axis of an optical system.

In some embodiments according to the present invention, when the derivative of the target 2D object-image mapping function has at least one local minimum or maximum, including in the center or at the edge of the field of view, the corresponding sag of at least one freeform surface used to control the 2D object-image mapping function also has the same number of local minimums or maximums as the 2D object-image mapping function when scanned in a corresponding coordinate system. In other words, the number of local minimums and of local maximums of the sag of the at least one freeform surface is identical to a number of local minimums and of local maximums of the 2D object-image mapping derivative function along at least one axis. For example, if the mapping function is defined as a function of the object field angle, the sag of the freeform surface would also be scanned as a function of object field angle to have the same number of local minimums or maximums. In some embodiments, the at least one local minimum or local maximum of the 2D object-image mapping derivative function is not in a center or at an edge of a field of view of the built optical system, but in a central region located between the center and the edge of the field of view.

In some other embodiments according to the present invention, when the scanning in a given direction is done along the object field angle, the at least one local minimum or maximum in the derivative of the 2D object-image mapping function and in the sag function is within ±5% of the total field of view. For the example of FIGS. 3A-3B and FIGS. 6A-6B, the total field of view would be 120° in both the X and Y directions and the ±5% criterion would mean the maximum or minimum are within ±6° in this example, which is the case. In some other embodiments, the at least one local minimum or maximum in the derivative of the 2D object-image mapping function and in the sag function is within ±10% of the total field of view, which would be ±12° in the example of FIGS. 3A-3B and FIGS. 6A-6B. In some other embodiments, when there is no symmetry around an optical axis and the total field of view is not double of the half field of view in a given scanning direction from a defined axis, the maximum or minimum could be within ±10% or within ±20% of the maximum half field of view angle. Again, for the example of FIGS. 3A-3B and FIGS. 6A-6B, this ±10% of the half field of view angle of 60° would be ±6° and this ±20% of the half field of view angle would be ±12°.

In other embodiments according to the present invention, when the derivative of the target 2D object-image mapping function has at least one local minimum or maximum when scanned with respect to the field angle, including in the center or at the edge of the field of view, the corresponding sag of at least one freeform surface used to control the 2D object-image mapping function also has the same number of local minimums or maximums as the 2D object-image mapping function when scanned with respect to a position coordinate on the freeform surface.

In some other embodiments according to the present invention, when the scanning in a given direction is done along different coordinate systems, the at least one local minimum or maximum in the derivative of the 2D object-image mapping function and in the sag function is within ±0.05 after normalization of the position of the maximum or minimum using the maximum value for that coordinate. For the example of FIGS. 3A-3B and FIGS. 5A-5B, the maximum half field of view of FIGS. 3A-3B being 60° in both directions, the normalized position of the maximum would be 48°/60°=0.8 in the Y direction and would be 25°/60°=0.416 in the X direction. For FIGS. 5A-5B, the normalized position of the maximum would be 1.15 mm/1.4 mm=0.821 in the Y direction and would be 0.55 mm/1.2 mm=0.458 in the X direction. In both directions, the normalized position of the maximum is within ±0.05. In some other embodiments, differences of position of each local minimum and local maximum along the at least one axis between the sag of the at least one freeform surface and the 2D object-image mapping derivative function are within ±0.1 or within ±0.2 in a normalized coordinate system. The normalization is done either according to a maximum value of the coordinate system or the value of the coordinate system for a chief-ray at a maximum field of view of the optical system along the at least one axis.

In other embodiments, in addition to the location of the at least one minimum or maximum between the derivative of the mapping function and the sag of the freeform surface, there is also a link between the height or amplitude of this at least one minimum or maximum. In other embodiments, there is also a link between the local curvature in various region of the resolution curve and the local curvature in corresponding region of the freeform surface.

In addition to the method to optimize the optical systems, the present invention also covers the built optical systems. More specifically, it covers an optical system with a target 2D object-image mapping derivative function, the optical system including a plurality of optical elements forming an image in an image plane, at least one of the plurality of optical elements including at least one freeform surface, the shape of the at least one freeform surface creating a target 2D object-image mapping derivative function, a sag of the at least one freeform surface of the optical system having at least one local minimum or local maximum across its surface and the 2D object-image mapping derivative function having at least one local minimum or local maximum.

In all of the examples above, the freeform surface is static, but the method according to the present invention also applies when a shape of the at least one freeform surface is dynamic. The method could also be used to define multiple shapes of at least one dynamic freeform surface, either at least one active surface changing its shape in real-time to adjust in real-time the 2D object-image mapping function or at least one static freeform element either rotated or translated in real-time to change the part of the surface on which rays are incoming and exiting the surface to adjust in real-time the 2D object-image mapping function. This also includes the idea of translating or rotating more than one optical element to adjust the mapping function in real-time while keeping a good image quality, as in an Alvarez lens system. In these dynamic cases, the method could be used to adjust the exact mapping function as various discrete positions of the at least one freeform element in order to create a continuous dynamically changing 2D object-image mapping function.

In all of the examples above, the method according to the present invention was used in an imaging system consisting of optical lens elements, but the method to adjust freeform surfaces to get an exact desired 2D object-image mapping function can also be used with imaging systems consisting of any type of optical element, including mirrors, diffractive elements, Fresnel elements, meta-material or the likes. The method can also be used in a projection optical system or an illumination system. Particularly in projection optical systems, the object-image mapping function is often inverted compared to an imaging system, with the object being described by an object height coordinate and the image being defined by an angular field angle coordinate. Even if the mapping function is inverted in these projection optical systems, the method according to the present invention to optimize the optical system with at least one freeform optical surface remains mostly the same.

In some embodiment according to the present invention, the method to adjust a freeform surface to control the 2D object-image mapping function is used in order to have a specific mapping function that maximizes the resulting total field of view in multiple directions of an image based on the 2D dimensions of the image sensor. For example, the target 2D object-image mapping function can be used to maximize simultaneously the vertical field of view, the horizontal field of view and the diagonal field of view of an image captured by an image sensor having a rectangular shape.

In some embodiments according to the present invention, instead of optimizing the freeform surface shape to get a specific 2D resolution curve, the freeform surface shape is optimized to get a specific 2D image quality in the object scene. The 2D image quality in the object scene is calculated from the product of the 2D resolution curve by the 2D image quality in the image plane, often expressed as a 2D MTF curve. This way, the method can be used to optimize a freeform surface in order to get a specific object image quality taking into account the 2D resolution curve of the lens and the optical aberrations it produces.

In all of the embodiments according to the present invention, a digital image file generated by an image sensor located at the image plane of the optical system can be further processed by hardware or software algorithm, including, but not limited to, algorithm to correct at least in part the non-symmetrical distortion in the image created by the specific 2D resolution curve.

All of the above figures and example show the method to adjust a freeform surface shape to get an optical system with the desired 2D object-image mapping function. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method to create an optical system with a target 2D object-image mapping derivative function, the optical system comprising at least one freeform surface and at least one other optical surface, the method comprising:
   a. using an initial optical design prescription as a starting point;
   b. alternating, until a final design prescription is obtained, the steps of:
      i. calculating at least one of a sag, a slope or a curvature of the at least one freeform surface to get an optical design prescription with the target 2D object-image mapping derivative function; and
      ii. optimizing the at least one other optical surface;
   c. building the optical system according to the final design prescription obtained, wherein the sag of the at least one freeform surface of the built optical system has at least one local minimum or local maximum across its surface and the 2D object-image mapping derivative function has at least one local minimum or local maximum.

2. The method of claim 1, wherein the at least one freeform surface is a first optical surface of the optical system.

3. The method of claim 1, wherein a field of view of the built optical system is identical in all directions.

4. The method of claim 1, wherein a field of view of the built optical system is greater than 60° in at least one direction.

5. The method of claim 1, wherein the at least one local minimum or local maximum of the surface is not on an axis intersecting the optical axis of the optical system.

6. The method of claim 1, wherein the at least one local minimum or local maximum of the 2D object-image mapping derivative function is not in a center or at an edge of a field of view of the built optical system.

7. The method of claim 1, wherein a shape of the at least one freeform surface is dynamic.

8. The method of claim 1, wherein the built optical system comprises at least a second freeform surface, the second freeform surface having an identical number of local minimums or local maximums in at least one corresponding coordinate system as the first freeform surface.

9. The method of claim 1, wherein a number of local minimums and of local maximums of the sag of the at least one freeform surface is identical to a number of local minimums and of local maximums of the 2D object-image mapping derivative function along at least one axis.

10. The method of claim 9, wherein differences of position of each local minimum and local maximum along the at least one axis between the sag of the at least one freeform surface and the 2D object-image mapping derivative function are within ±0.2 in a normalized coordinate system, wherein normalization is done either according to a maximum value of the coordinate system or the value of the coordinate system for a chief-ray at a maximum field of view of the optical system along the at least one axis.

* * * * *